INVENTOR.
KIYOSHI INOUE
BY Karl F. Ross
ATTORNEY

INVENTOR.
KIYOSHI INOUE
BY
Karl F. Ross
ATTORNEY

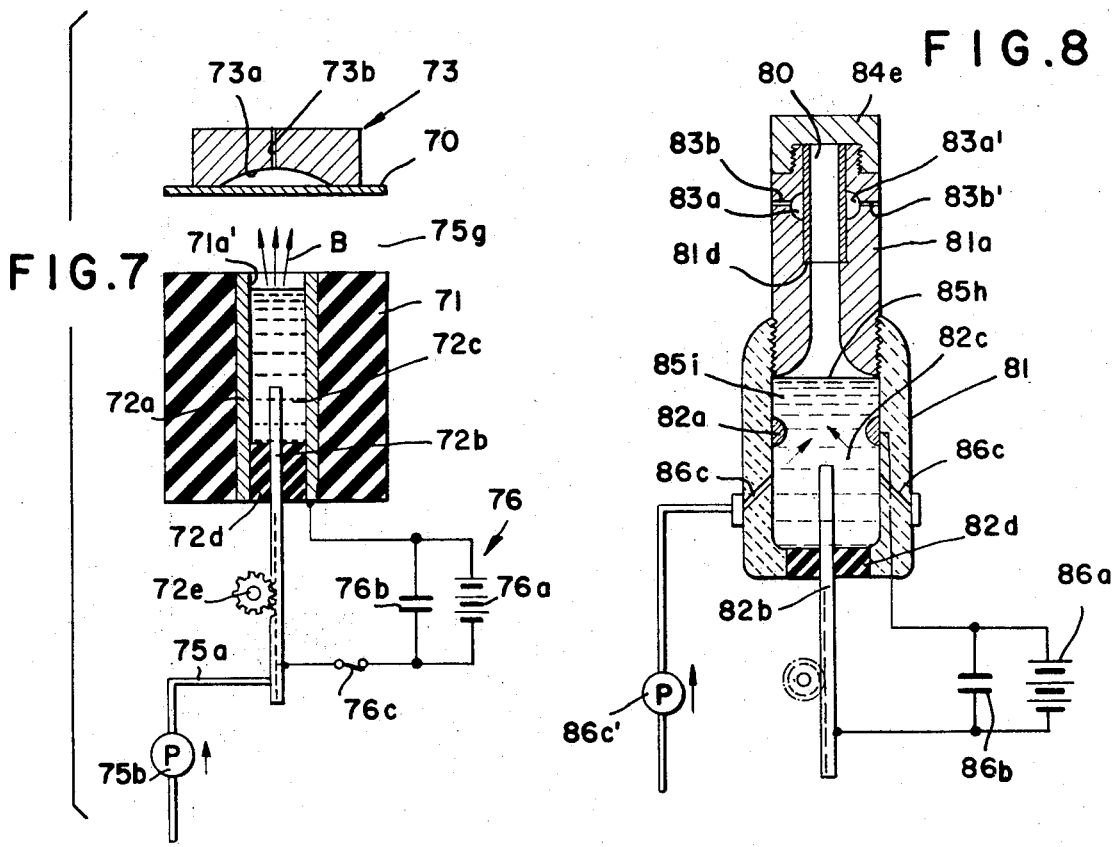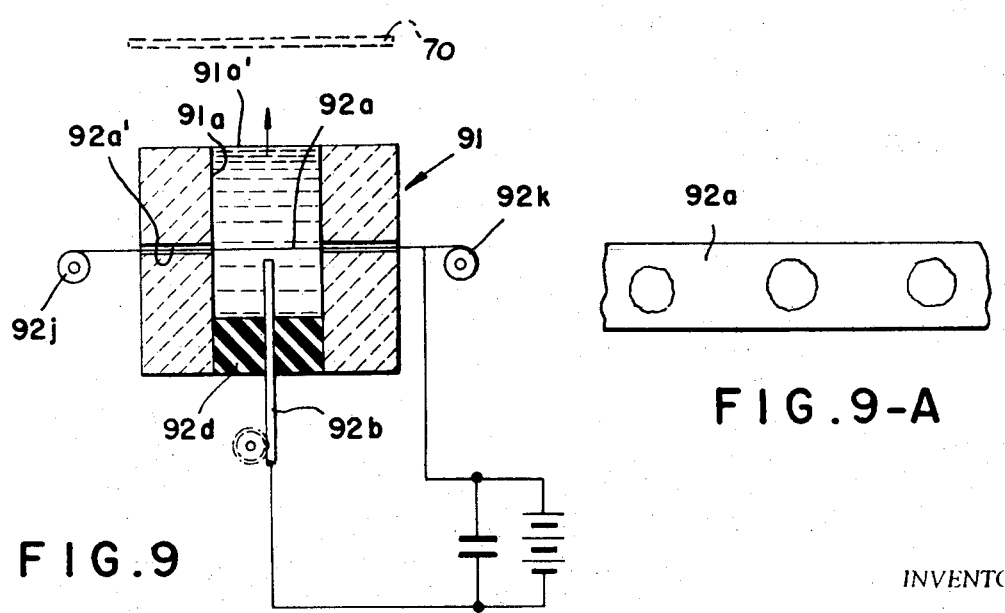

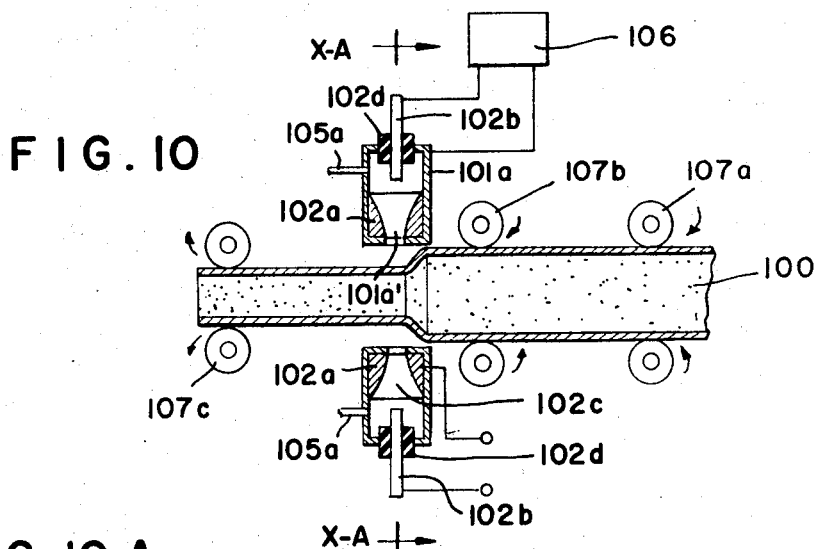
FIG. 10
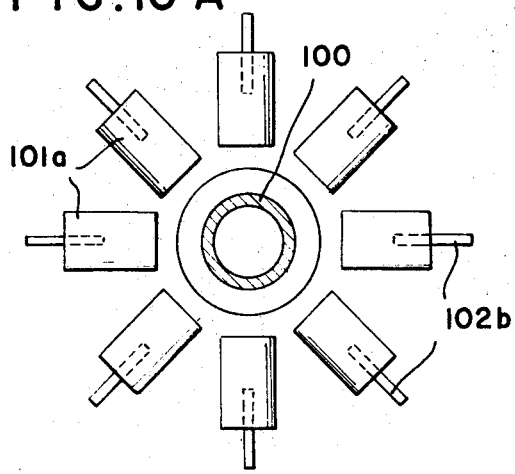
FIG. 10-A
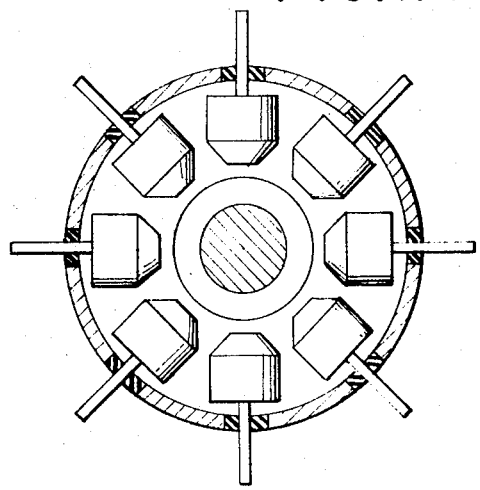
FIG. 11-A
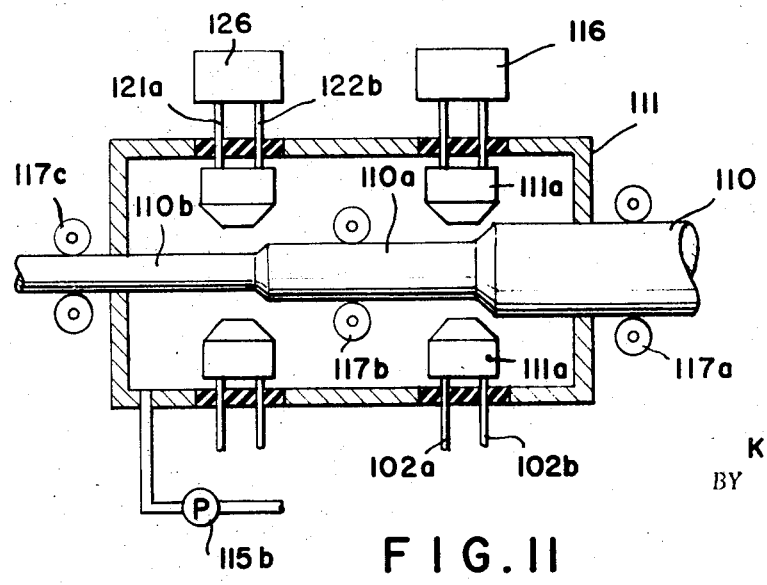
FIG. 11

United States Patent Office 3,566,647
Patented Mar. 2, 1971

3,566,647
HYDROIMPACT, HIGH ENERGY-RATE FORMING OF PLASTICALLY DEFORMABLE BODIES
Kiyoshi Inoue, Tokyo, Japan
(100 Sakato, Kawasaki, Kanagawa, Japan)
Continuation-in-part of application Ser. No. 574,056, Aug. 22, 1966, which is a continuation-in-part of application Ser. No. 311,061, Sept. 24, 1963, now Patent No. 3,276,558, and application Ser. No. 508,487, Nov. 18, 1965, now Patent No. 3,512,384, the latter being a continuation-in-part of application Ser. No. 41,080, July 6, 1960, now Patent No. 3,232,085, and also a continuation-in-part of applications Ser. No. 629,633, Apr. 10, 1967, now Patent No. 3,461,268, and Ser. No. 696,757, Jan. 10, 1968. This application June 10, 1968, Ser. No. 735,760
Claims priority, application Japan, Aug. 28, 1967, 42/55,102; Nov. 9, 1967, 42/72,156; Nov. 10, 1967, 42/72,315
Int. Cl. B21d 26/14
U.S. Cl. 72—56
18 Claims

ABSTRACT OF THE DISCLOSURE

A hydroimpact-forming system in which a column of liquid in a barrel of a shock-forming gun is trained upon the workpiece and electric discharge is effected in the column to propel the column against the workpiece and produce a shock wave superimposed on the gross movement of the liquid to shape the workpiece. The liquid is preferably directed at the workpiece in a jet with a velocity of 100–10,000 m./second with the discharge being superimposed impulsively on this jet.

---

This application is a continuation-in-part of my application Ser. No. 574,056, filed Aug. 22, 1966 as a continuation-in-part of application Ser. No. 311,061 of Sept. 24, 1963 (now U.S. Pat. No. 3,276,558) and application Ser No. 508,487 of Nov. 18, 1965 (now Pat. No. 3,512,-384), the latter being a continuation-in-part of application Ser. No. 41,080 of July 6, 1960 (now U.S. Pat. No. 3,232,085), as well as a continuation-in-part of the copending applications Ser. Nos. 629,633 (now Pat. No. 3,461,268) and 696,757, filed Apr. 10, 1967 and Jan. 10, 1968, respectively.

The present invention is directed to improvements in the shaping of plastically deformable bodies with the aid of high-energy-rate forces, i.e. impulsive forces as generated by a spark discharge, and to a method of and an apparatus for carrying out the improved shaping operation.

As pointed out in applications Ser. Nos. 574,056, 629,-633 and 696,757, earlier arrangements for the shaping of metals and for the bonding of metals to other bodies can make use of the high energy-rate force of the impulsive action generated at least in part by an electrical discharge in a fluid. A basic system for exploiting this principle has been disclosed and claimed in U.S. Pats. No. 3,232,085, No. 3,232,086 and No. 3,276,558.

The principle there described is that an electric discharge in a fluid e.g. a viscous medium such as a liquid or a nonviscous medium such as a gas, produces a shock wave which can be transmitted to a metallic body in order to transfer the kinetic energy of the shock wave to this body and apply it against a die or to transfer the kinetic energy to a mass of particles which are compacted to a coherent mass or are applied as a mass or as discrete particles to a body or substrate. The relatively instantaneous or momentary development of a shock within the body of fluid (e.g. by an ionization of part of the fluid or the explosive development of a spark discharge), can give rise to a shock wave whose velocity and energy is such that the body will be shaped or the particles will be applied to a substrate at a velocity sufficient to permit bonding between them.

Application Ser. No. 574,056 extends these basic principles to the kinetic deposition of particulate materials upon a substrate. For example, metallic substrates may be coated with pulverulent materials by juxtaposing the source of a detonation-type impulsive wave (e.g. a fusible element electrically disintegratable to produce a spark discharge or a pair of electrodes in spaced relationship for sustaining such discharge), with a surface of the body to be coated and disposing between the body and this source a mass of pulverulent material. The detonation wave produced by the source drives the particles onto the substrate with sufficient velocity to lodge the particles thereon with a firm bond between the layer of particles and the substrate. The pulverulent material may be a layer of powder supported upon a frangible foil, film, sleeve or sheet juxtaposed with the surface to be coated, the diaphragm separating a discharge chamber from the workpiece. In this application, I have described the importance of a barrel-shaped configuration for the shock-wave generator which can here include a needle-shaped electrode extending axially into the cylinder barrel which is trained upon the substrate. That application also describes the advantage of carrying a spark discharge in a liquid which is in force-transmitting relationship with the body to be shaped, e.g. a piston. Thus it has been shown to be desirable to provide the discharge chamber as a "gun" whose barrel is trained upon the workpiece and receives at an intermediate location a mass of particles to be propelled against the workpiece. In a horizontal position of the barrel, the particles can be introduced continuously between the discharge end and the mouth, while a rapid train of pulses is supplied across the electrodes so that a sequence of discharges results in an intermittent but high rate propulsion of the particles against the workpiece surface.

In further developments described in application Ser. No. 629,633, the barrel-temperature has been shown to have an effect upon the adhesion of the particles to the substrate. The latter application emphasizes the fact that a number of barrels can be trained upon the substrate surfaces and can extend normal to the latter and/or that the barrels and substrate can be shifted relatively to effect an efficient coating of the substrate with the particles. In application Ser. No. 696,757, the principle of creating a plasma or preheating the particles within or externally of the barrel has been described. In the last-mentioned application, means is provided for preheating the particles or electrically subdividing same to render them more readily adherent to the subtrate. Thus the particulate mass may be formed in situ within the barrel of the discharge chamber by thermal distruction of a fusible material. Thermal destruction is carried out by electrical disintegration or erosion of a fusible element, e.g. by hot gases preferably in the form of a plasma.

In my prior systems making use of spark-induced shock waves for the shaping of sheet-metal bodies in a die, for example, the advantage of confining the discharge to a fluid-tight chamber, filled with a liquid in force-transmitting relationship with the workpiece or with a rubber membrane in contact with the workpiece, has been emphasized. In these systems, however, the body of a liquid undergoes outward and substantially uniform expansion from the site of the discharge.

It is the principal object of the present invention to extend some of the principles set forth in the aforementioned applications and improve the high energy-rate shaping of or forming (HERF) plastically deformable workpieces.

Another object of this invention is to provide a method of and an apparatus for the efficient and economic shaping of plastically deformable bodies of large area and complex configuration, especially for the shaping of bodies requiring higher shaping energies in certain regions than in others.

Still another object of my invention is to provide a system for the shaping of metallic and other plastically deformable bodies at selective areas and without undue concentration of the shaping pressures in regions in which such shaping pressures are undesirable.

It has now been found that it is possible to selectively shape large-area metallic bodies or selectively apply high energy-rate forces to selected regions of the body to be deformed thereby, by training at the workpiece, from a location spaced therefrom, a discharge chamber whose barrel receives a liquid column which is propelled at least in part by the spark-induced shock wave against the workpiece surface. More specifically, I have observed that, when a column of liquid is trained upon a limited region of a workpiece and is constituted as a dynamic force-transmitting medium such that it is actually propelled against this surface rather than confined to a function as a shock wave transmitting medium, highly improved accuracy can be obtained in conforming the workpiece to a die than is possible with systems with a relatively static liquid media filling a closed space and in force-transmitting relationship with the workpiece.

According to a specific feature of the present invention, the mouth of the barrel and indeed the liquid level therein is located below the workpiece surface so that ambient gas fills the space between the liquid in the barrel and a workpiece. Upon the generation of a spark discharge across an electrode gap immersed in the liquid of the barrel, the entire liquid column is propelled in the direction of the workpiece. A number of such barrels, provided with means for refilling the barrel chambers with a liquid (preferably a dielectric), are trained at respective regions of the workpiece or the discharge gun is constituted as a swingable member adapted to sweep its impact across the surface. Advantageously, the means for refilling the barrel may also be used for delivering liquid to the latter at a rate sufficient to produce a high-velocity liquid stream contacting the workpiece even in the absence of impulsive force. This stream may be continuous and/or pulsed to coincide with the electric discharges.

Extending the principles of my application Ser. No. 508,487 still further, I provide, between the mouth of the discharge chamber and its water column, a force-transmitting medium constituted as a rubber member or diaphragm separating the discharge chamber from the surface of the workpiece and overlying the latter so as to conform to the shaped configuration of the workpiece. Such membrane or diaphragm has been found to decrease the tendency of metallic workpieces to cracking and to facilitate homogeneous distribution of forces along the workpiece surface. Additionally, this diaphragm may be used to seal the shock chamber.

Still another feature of this invention involves the provision of a secondary force-transmitting medium between the mouth of the discharge chamber (and its liquid column) and the workpiece; the secondary force-transmitting medium may include a completely confined liquid column having a force-transmitting membrane at its input end and a rubber diaphragm adjacent the workpiece at its output end. In spite of concepts which have been current heretofore, as to the nature of force distribution in a confined liquid, it has been found that this intermediate or secondary column can be used to distribute force to the workpiece and/or to localize such forces. An additional feature of this aspect of the invention resides in the use of the secondary column as a piston or ram which is bodily driven against the workpiece in addition to transmitting a shock wave thereto. When the liquid column is used as a ram and a jet of liquid is trained at the workpiece to constitute the force-transmitting medium, I prefer a velocity of the jet or ram of 100–10,000 meters/second so that the velocity of the liquid and the shock wave exceeds Mach 1. The liquid may also be confined by a rupturable diaphragm or in a rupturable bladder as described, for example, in application Ser. No. 629,633.

According to yet a further feature of the instant invention, one of the electrodes is an electrically disintegratable member, e.g. a foil, disposed in the liquid forming the jet or ram to contribute ionizable particles to the system upon discharge. The kinetic energy of the wave transmitted to the workpiece is thereby increased.

The above and other objects, features and advantages of the present invention will become more readily apparent from the following description, reference being made to the accompanying drawing in which:

FIG. 7 represents another device for shaping a workpiece in which a liquid ram is employed;

FIG. 8 is an axial cross-sectional view through a system illustrating another arrangement for triggering the discharge;

FIG. 9 represents a view similar to FIG. 7, but using a modified electrode arrangement;

FIG. 9A is a plan view of the foil electrode thereof;

FIG. 10 is an axial cross-sectional view through a system for the drawing of a tube in accordance with the present invention;

FIG. 10A is a diagrammatic cross-sectional view along the line XA—XA of FIG. 10;

FIG. 11 is an axial cross-sectional view through a two-stage "extruding system according to this invention; and FIG. 11A is a cross-sectional view along the line XIA—XIA of FIG. 11.

Figure 1:
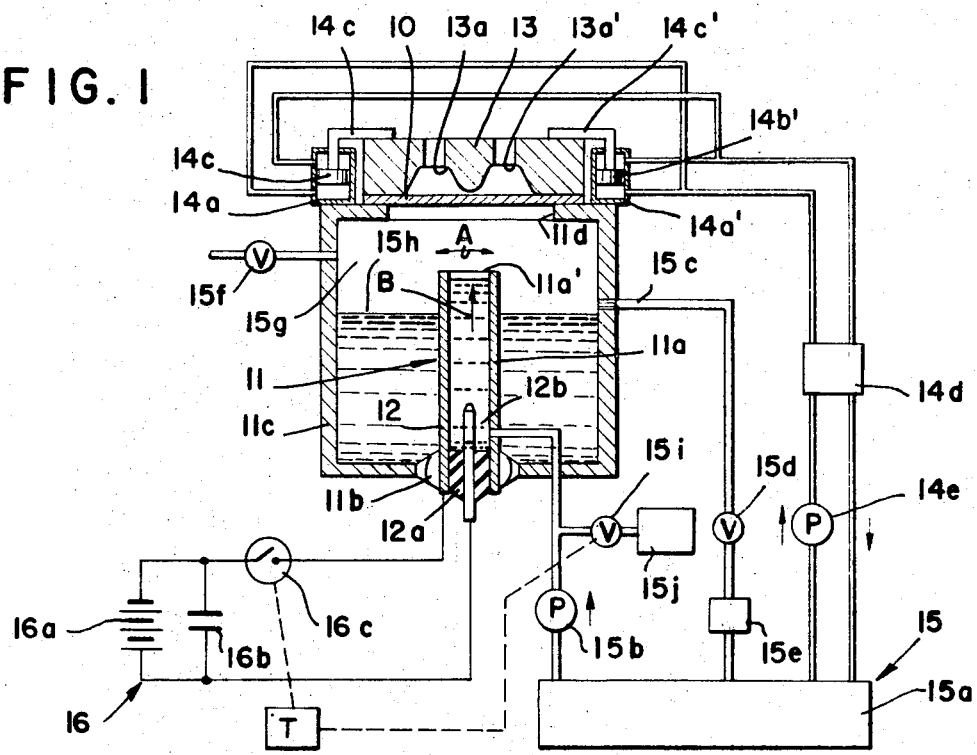
FIG. 1 is a diagrammatic vertical cross-sectional view through an apparatus for the hydroimpact forming of a sheet metal workpiece in accordance with this invention.

In FIG. 1, I have shown the basic apparatus for shaping a workpiece 10 in accordance with the invention. This apparatus comprises a high energy-rate generator 11 having a cylindrical barrel 11a mounted in a swivel 11b of a housing 11c to allow the mouth 11a' of the barrel to be swung in the direction of arrow A and trained selectively upon various portions of the surface of the workpiece 10.

The barrel 11a is trained upwardly and receives an electrode 12 which extends centrally upwardly into the lower end of the barrel 11a through a block 12a of electric insulation. The workpiece 10 underlies and is juxtaposed with a die 13 whose cavities 13a and 13a' are adapted to shape this workpiece. The die 13 is clamped to the upper end of the housing 11c which is open at 11d to allow the jet B emerging from the barrel 11a to be directed upon the workpiece 10. The clamping means here comprises a pair of hydraulic cylinders 14a and 14a' whose pistons 14b and 14b' have L-shaped arms 14c and 14c' engageable with the surface of the die 13 remote from the workpiece 10. The cylinders 14a and 14a' are supplied with hydraulic fluid via a control valve 14d and a hydraulic pump 14e from a fluid reservoir 15a. In this case, a dielectric fluid (e.g. transformer oil) is used after force transmitting medium and the hydraulic fluid has operated the clamps.

The jet B is produced at a velocity of 100 to 10,000 m./sec. by a pump 15b of the liquid-circulating system 15c, which draws fluid from the reservoir 15a and forces it into the barrel 11a of the shock-wave generator. The jet B thus applies energy to the workpiece 10 which is represented by the relationship $mv^2/2$, where $m$ is the mean mass of the liquid and $v$ is its velocity. The total kinetic energy applied to the workpiece has been found to be equal to or greater than the sum of the kinetic energy of the liquid (in the absence of a shock wave) and the shock-wave energy in the absence of the liquid. The shock wave is generated by an electric discharge between the electrode 12 and the barrel 11a which here forms a counter-electrode. The power supply may comprise a battery 16a adapted to charge a storage capacitor 16b and to discharge the latter through a switch 16c which represents any timing device for intermittently and/or permanently discharging the capacitor 16b across the electrode assembly.

After a workpiece 10 is clamped between the die 13 and the housing 11c by the clamping assemblies 14a–14c and 14a'–14c', the dielectric liquid is introduced at high velocity to the discharge chamber 11 and passes upwardly through the barrel 11a (arrow B) to impinge upon the workpiece 10 except liquid which is laid via an overflow tube 15c back to the reservoir 15. A valve 15d and a filter 15e are in the return path. A venting valve 15f permits air to be discharged from the space 15g above the liquid level 15h in the housing 11c.

The system illustrated in FIG. 1 may be operated with one or several modes. Initially, for example, valve 15d can be closed and liquid into the chamber of housing 11c to completely fill the latter and expel all air from its interior. Under these conditions, the liquid can be terminated and spark discharge initiated at the gap 12b between the electrode 12 and the barrel 11a. This system is analogous to that described in application Ser. No. 508,-487 and allows the static liquid to constitute a force transmitting means adapted to initiate shaping of the workpiece in accordance with these principles.

In the second mode of operation usually after or before the mode previously described, air is admitted via valve 15f into the chamber and the liquid level is maintained at 15h. The barrel 11a may be filled with liquid until it overflows at the mouth 11a', whereupon the liquid flow is terminated. The spark discharge then propels the column of liquid from the barrel 11a against the workpiece 10.

Finally, liquid may be forced through the barrel 11a at the high velocity mentioned earlier and the discharge shock waves superimposed upon the liquid jet. In this case a synergistic effect can be observed in the transfer of energy to the workpiece. The jet may be pulsed via a timer T synchronized the switch 16c with a valve 15i connecting the accumulator 15j with the liquid-input line of the shock wave generator 11.

Figure 2:
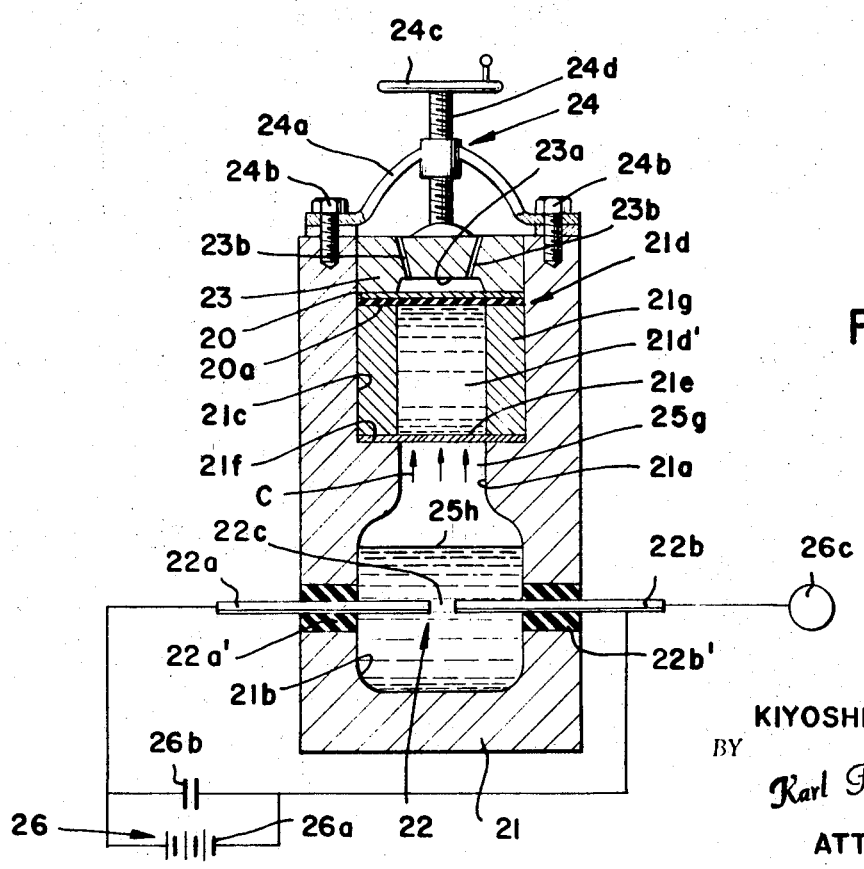
FIG. 2 is an axial cross-sectional view through another system of this general type.

In FIG. 2, I show a modification of this system wherein the housing 21 has a bottle-shaped chamber 21b, the neck 21a of which forms a barrel in accordance with the principles of the present invention. At its upper end, the housing 21 is provided with cylindrical recess 21c in which a secondary force-transmitting assembly 21d is received. This assembly can include a flexible or frangible diaphragm 21e held in place against an inwardly extending shoulder 21f by a cylindrical sleeve 21g under pressure developed by the clamping means 24. This clamping means includes a spider 24a the arms 24b of which are bolted to housing 21 at its end remote from the electrode assembly 22. A handwheel 24c can drive a screw 24d axially to press a die 23 against a workpiece 20 and a flexible (e.g. rubber or other elastomeric materials) membrane 20a. Similarly, an elastomeric membrane may be juxtaposed with the workpiece 10 of FIG. 1. The die 23 is provided with a cavity 23a into which the workpiece 20 may be deflected, this cavity being vented to the exterior by passages 23b (analogous to the passages 13b of FIG. 1) to prevent the formation of a compression-resistant gas cushion in the die.

The die 23, which is axially shiftable in the recess 21c, thus clamps the workpiece 20 and the membrane 20a against the cylindrical sleeve 21g and clamps this sleeve against the diaphragm 21f. A body of liquid (represented at 21d') is thereby constituted as the auxiliary force-transmitting ram 21d. The electrode assembly 22 comprises a pair of electrode rods 22a and 22b extending radially into the chamber 21b through insulating sleeves 22a' and 22b'. The spark-discharge source of this embodiment is represented generally at 26 and includes storage capacitor 26b connected across a battery 26a. The initiation of the discharge can be effected by a triggering control 26c which advances the electrode rod 22b toward the electrode rod 22a until the spacings of gap 22c are less than that at which the potential across the electrodes are effecting breakdown of the dielectric. At this point a discharge is initiated and withdrawal of the electrode 22b is possible until the spark terminates. The process can be commenced again after replacement of the workpiece or can be repeated to apply a succession of shock waves against workpiece and die.

Prior to positioning the auxiliary ram 21d in the recess 21c, the chamber 21b can be filled with the dielectric liquid to a level 25h such that a gas space 25g is formed between the liquid column in the force-transmitting assembly 21d. Upon the generation of a discharge across the gap 22c, the liquid in chamber 21b is driven upwardly (arrow C) to apply hydroimpact pressure to the diaphragm 21e. Since the liquid 21d' which may be water, is completely confined, it acts as a rigid column to drive the membrane 20a and the workpiece 20 into the die 23a. I find that the column 21d' serves to distribute the forces uniformly to the recess 20 and prevent shearing of the latter even when the die is formed with relatively sharp surfaces. It will be understood that the triggering means of FIG. 2 can be employed in place of the switch 16c of FIG. 1 and, conversely, that the switch 16c can be connected in series with the electrodes 22a and 22b and the triggering device 26c omitted.

Figure 3:
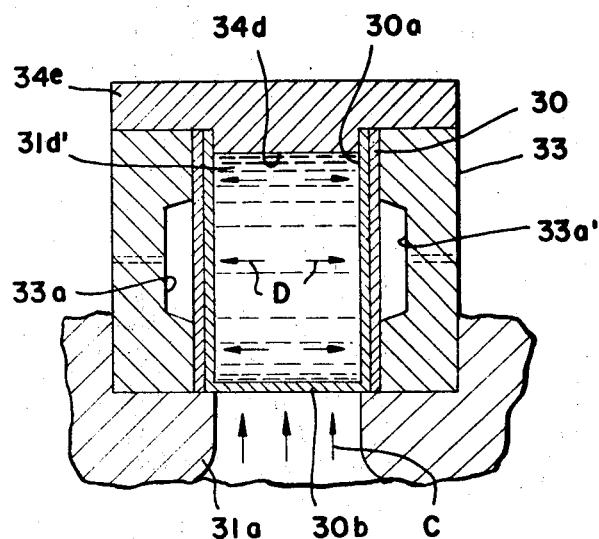
FIGS. 3–6 are axial cross-sectional views illustrating the secondary force-transmitting means of this invention.
Figure 4:
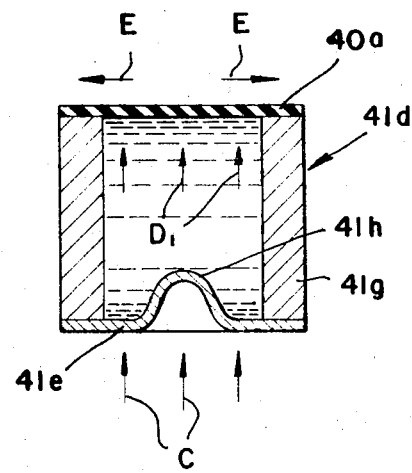

The liquid column serving as the secondary force-transmitting medium is able to distribute the high energy-rate forming pressure uniformly to a plurality of dies angularly equispaced about the axis of the barrel 21a or, as shown in FIG. 3, to a tubular die 33 having cavities 33a and 33a' angularly equispaced about the axis of the barrel 31a. The spark chamber here operates identically to the system described in FIG. 2 and of corresponding construction. The secondary liquid column 31d' may be here hermetically sealed in an upwardly open cup-shaped membrane 30b the cylindrical wall 30a of which lines the tubular workpiece 30 as described in my application Ser No. 508,487. The upper end of the bladder 30a, 30b is closed by a plug 34d of a clamping plate 34e held in place by the assembly 24 previously described. In this system, the upward force (arrow C) from the barrel 31a is transferred into a radially outwardly force (arrow D) to drive the workpiece 30 into the cavities 30a and 30a' of the die.

When the presence of air in the die cavity is a problem (e.g., as in the system of FIG. 2), it is advantageous to provide means for guiding the trapped air outwardly through the passages 23b and, in effect, roll the workpiece 20 toward these openings. To this end, the secondary force transmitting means 41d may include the cylinder 41g which is clamped in place in the cavity 21c of FIG. 2 but is formed with a lower metal foil diaphragm 41e. The diaphragm has an inwardly bent central protuberance 41h. This protuberance is closer to the rubber diaphragm 40a juxtaposed with the workpiece 20 (FIG. 2) so that the shock wave transferred to the workpiece has its greatest intensity at the central zone (arrow $D_1$). The air within the die is driven outwardly (arrows E).

Figure 5:
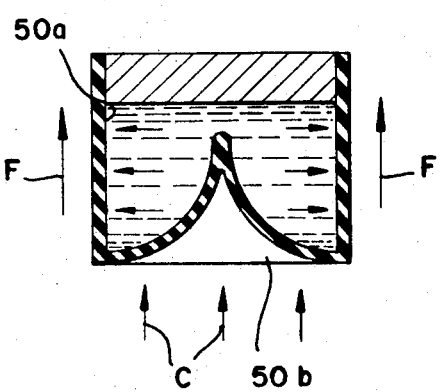
Figure 6:
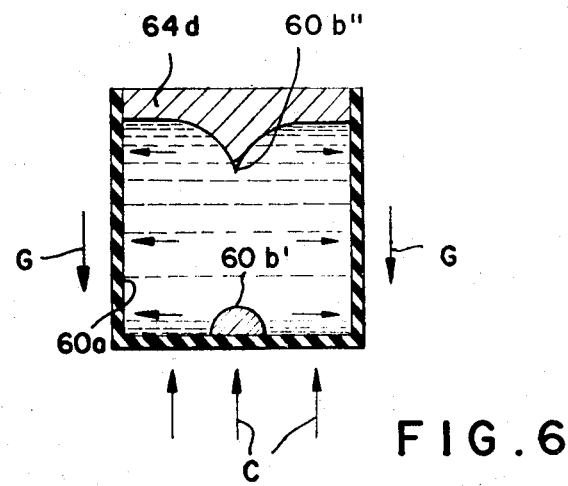

The system of FIG. 5 may be used to drive the air within the die cavities 33a and 33a' upwardly (arrows F) when the rubber bladder 50a has the configuration shown in FIG. 5. Thus the floor 50b of this bladder, receiving the shock wave as represented by arrows C from the barrel, is formed with a central peak and slopes arcuately outwardly therefrom to the cylindrical membrane wall. FIG. 6 shows how the gases within the die can be driven downwardly (arrows G) by the use of a cylindrical bladder 60a the floor 60b of which is provided with a convex central portion 60b' in line with a rigid peak 60b" formed on the plug 64d.

FIG. 7 shows a system wherein the barrel 71a formed by the housing 71 is trained via an air gap 75g upon the metallic workpiece 70 overlying a die 73 whose cavity 73a communicates with the atmosphere via a vent 73b. One of the electrodes of this system is formed as a liner 72a extending the full length of the barrel 71a and cooperating with a needle electrode 72b for generating a spark discharge in the annular gap 72c surrounding the needle electrode 72b. The needle electrode is supported in a block 72d of electrically insulating material and is axially shiftable via the rack-and-pinion arrangement 72e to adjust the discharge location relatively to the mount 71a' of the shock-forming gun. The power supply 76 comprises a battery 76a connected across the storage capacitor 76b which can be discharged, via switch 76c, to generate the electric discharge. A source of dielectric fluid, here represented as a pump 75b is connected via a flexible tube 75a to the tubular electrode 72b to produce a jet of liquid directed against the workpiece 70 as represented by the arrow B. The housing 71 may be swingable (see FIG. 1) to localize or distribute the high energy-rate forming pressure and a rubber membrane can overlie the workpiece 70 (or the workpiece 10 of FIG. 1) as described in connection with FIG. 2.

In this embodiment, the discharge is generally annular and has been found to induce a magnetic field which is effective in the axial direction to increase the energy of the shock wave propagated toward the workpiece (arrow B). In general, therefore, it is preferred to provide the electrode assembly with at least one annular electrode and at least one central electrode such that the induced magnetic effect of the discharge serves to accelerate charged particles in the direction of the workpiece and thereby increase the effective energy of the forming process. The system of FIG. 7 can operate intermittently, i.e., in a fill-and-fire mode or with a high-velocity jet as mentioned earlier. The shock-forming pressure attainable with these systems can be represented by the formula $P \approx \rho c v$ where $\rho$ is the density of the liquid medium, $c$ is the propagation velocity of the shock wave developed at the electrode in the gun and $v$ represents the velocity of the dispersed liquid jet impinging as particles upon the object.

In the system of FIG. 8, the bottle-shaped housing 81 is internally threaded at its upper end and receives the male thread of a narrow neck 81a reaching downwardly to the level 85h of the liquid 85i within the chamber 81c of the device. The inner wall of this chamber is lined with an annular electrode 82a which is connected with one terminal of the storage capacitor 86k which is charged by the battery 86a. The other electrode may be a needle electrode 82b similar to that described and illustrated in connection with FIG. 7 and received in an insulating block 82d. I have found that best results are obtained when the electrodes are silver-tungsten alloys. The neck 81a of the gun simultaneously forms the die and is provided with cavities 83a and 83a' vented to the atmosphere by radial ports 83b and 83b'. An annular recess 81d is formed in the neck 81a so that the inner wall of the workpiece 80 is flush with the inner wall of the neck. The latter is closed by a gap 84e. The discharge of this embodiment is triggered by the introduction intermittently of a conductive substance via ports 86c into the annular gap 82c between the electrodes 82a and 82b. To this end, a blower or pump may be provided at 86c' for introducing an electrolyte, a metal powder or a metallic wire between the electrodes.

As indicated earlier, it has been found to be advantageous to supply to the liquid column in which the discharge is carried out, particles of relatively high mass which, in turn, increase the transferred kinetic energy. This may be accomplished (see my application Ser. No. 629,633) by using as one of the electrodes, a metallic foil 92a (FIGS. 9 and 9A) which is led through a slot 92a' in the housing 91 from a supply reel 92j to a takeup rim 92k. The foil 92a can thus also serve as a partition between two liquid columns (see FIG. 2). The other electrode is represented at 92b and is received in an insulating block 92d as previously described. In this embodiment, the discharge may be initiated by advancing the electrode 92b toward the foil 92a. The high energy liquid column is propelled from the mouth 91a' of the barrel 91a to shape the workpiece. In place of a foil 92a which, upon leaving the barrel 91a, has holes as illustrated in FIG. 9A, a metal wire or screen may be employed.

In FIGS. 10 and 10A, I have shown a system using principles of the present invention for the extrusion or drawing of a tubular workpiece 100 which is filled with a supporting substance (e.g. sand) accommodating plastic deformation of the tube. The tube is based between sets of rollers 107a, 107b and 107c, the latter set being driven at a rate somewhat higher than the rate of rotation of the rollers 107a and 107b. At a drawing location, represented by the sectional plane XA—XA of FIG. 10, I have provided an annular array of angularly equispaced shock-forming guns whose barrels 101a have their mouths 101a' trained upon the workpiece 100. Each of the barrels is supplied with a high-velocity stream of liquid via a pipe 105a to produce jets with a velocity of 100—10,000 m./second trained upon the workpiece.

Within each of the guns, I provide a central electrode 102b in the insulating block 102d for producing an annular discharge in the gap 102c between the needle electrode 102b and the annular electrode 102a. A power supply 106 is connected across each of the guns and may be identical to the power supply 16 illustrated in FIG. 1. As the workpiece 100 is drawn past the array, it is inwardly compressed by the high energy-rate forming pressure to reduce the cross-section of the body (FIG. 10).

A two-stage arrangement is illustrated in FIGS. 11 and 11A in which two arrays of shock-forming barrels 111a and 121a are provided at axially spaced locations along the workpiece 110 to form the steps 110a and 110b therein. The workpiece is drawn past the housing 111 via the rollers 17a, 17b and 17c working at progressively higher speeds in accordance with the elongation.

The housing 111 is drained by a pump 115b which delivers the liquid via filter to the barrels 111a and 121a. The electrodes of these barrels are represented at 102a and 102b and at 121a and 122b and are energized via respective power supplies 116 and 126 as previously described.

The improvement described and illustrated is believed to admit of many modifications within the ability of persons skilled in the art, all such modifications being considered within the spirit and scope of the invention except as limited by the appended claims.

I claim:

1. A method of shaping a plastically deformable workpiece comprising the steps of training into force-transmitting relationship with said workpiece across a gas-filled space a column of liquid propelling said column of liquid across said space, and applying to the column of liquid propelled across said space against said workpiece an electrospark-induced shock wave.

2. The method defined in claim 1 wherein said column of liquid is contained in a barrel trained upon said workpiece and a spark is triggered in said column.

3. The method defined in claim 2 wherein an auxiliary liquid column is interposed between the first-mentioned column and said workpiece in force-transmitting relationship between said first liquid column and said workpiece.

4. The method defined in claim 2, further comprising the steps of relatively displacing said workpiece and said barrel to sweep the shock wave and liquid column propelled from said barrel over the surface of said workpiece.

5. An apparatus for the hydroimpact forming of a workpiece, comprising a shock-wave generator provided with a liquid-containing chamber and a barrel trained on said workpiece; liquid-displacement means for propelling a liquid column across a gas-filled space from said chamber toward said workpiece; and electrode means immersed in liquid in said chamber for initiating a spark discharge therein to generate a shock wave in the column of liquid propelled from said barrel toward said workpiece.

6. The apparatus defined in claim 5 wherein said liquid-displacement means includes a pump for supplying liquid to said column at high velocity and for directing a jet of said liquid against said workpiece, said shock wave being superimposed upon the jet of liquid directed against said workpiece.

7. The apparatus defined in claim 5, further comprising means for relatively displacing said workpiece and said barrel to sweep the column of liquid and shock wave along the surface of said workpiece.

8. The apparatus defined in claim 5, further comprising means forming a second liquid column in force-transmitting relationship with said workpiece and in force-receiving relationship with the first-mentioned column of liquid for delivering a hydraulic impact and shock wave to said workpiece.

9. The apparatus defined in claim 8 wherein said means forming said second liquid column includes a diaphragm interposed between said columns and confining said second column.

10. The apparatus defined in claim 9 wherein said diaphragm is convex in the direction of said workpiece.

11. The apparatus defined in claim 5, further comprising an elastomeric membrane juxtaposed with said workpiece and disposed between said workpiece and said barrel.

12. The apparatus defined in claim 5 wherein said electrode means includes an electrode rod extending axially into said barrel, and an annular electrode spacedly surrounding said rod for generating an annular discharge therewith.

13. The apparatus defined in claim 5 wherein said workpiece is an elongated body and a plurality of hydroimpact-forming guns are disposed in an annular array in angularly equispaced relationship around said workpiece, each of said guns having a respective barrel and electrode means for directing a column of liquid and respective shock waves generally radially against said workpiece.

14. A method of plastically deforming a workpiece into an intricate shape, comprising the steps of:
 (a) preparing a die of contour having a plurality of recesses coresponding to said intricate shape;
 (b) juxtaposing the die contour with the workpiece and clamping the die and the workpiece together with the workpiece being located below the die;
 (c) directing a column of liquid from a barrel, generally upwardly across a gas-filled space toward a particular region of said workpiece juxtaposed with a selected portion of said recesses of said die;
 (d) effecting an impulsive electric discharge in said liquid of column to produce a hydroimpact force sufficient to plastically deform said surface region against said selected recess portion of the die;
 (e) relatively displacing said barrel and said workpiece while the latter is clamped in a fixed relationship with said die and iterating the steps (c) and (d) at a different region of said workpiece; and
 (f) repeating the step (e) until the workpiece is conformed to said die contour.

15. An apparatus for plastically deforming a workpiece into an intricate shape, comprising:
 a die shaped with a contour having a plurality of recesses corresponding to an intricate shape to be imparted to a workpiece;
 means for clamping said workpiece and said die with the deformable region of said workpiece situated in juxtaposed position with said die contour;
 a hydroimpact generator provided with a liquid-containing chamber terminating at the upper end of a barrel adapted to direct a column of liquid generally upwardly across a gas-filled space toward a portion of said workpiece for deformation, said generator having electrode means for effecting in said column of liquid an impulsive electric discharge thereby producing a hydroimpact force sufficient to plastically deform said portion of said workpiece against the correspondingly juxtaposed recess portion of said die; and
 means for relatively displacing said barrel and said workpiece clamped with said die to sweep hydroimpact forces from said barrel sequentially to different portions of said workpiece against the corresponding juxtaposed recess portions of said die contour.

16. An apparatus as defined in claim 15 further comprising a housing having an upper end at which is clamped said die and said workpiece, said housing having a container adapted to collect liquid after it acts as the column of liquid on said workpiece, said apparatus further comprising means for recirculating said collected liquid into said hydroimpact generator.

17. An apparatus defined in claim 16 wherein said impulse generator is swivelably mounted on said housing for enabling displacement of said barrel relative to said workpiece.

18. An apparatus defined in claim 15 wherein said electrode means includes a rod-like electrode centrally inserted into said barrel and an annular counterelectrode formed at least in part by said barrel.

References Cited

UNITED STATES PATENTS

| | | | |
|---|---|---|---|
| 2,385,083 | 9/1945 | Kemerer | 72—56 |
| 3,057,313 | 10/1962 | Setser | 72—56 |
| 3,225,578 | 12/1965 | Krieger | 72—56 |
| 3,306,089 | 2/1967 | Brayman | 72—56 |
| 3,371,404 | 3/1968 | Lemelson | 29—421 |
| 3,438,125 | 4/1969 | Larsen et al. | 72—56 |

FOREIGN PATENTS 506,599  9/1930  Germany.

RICHARD J. HERBST, Primary Examiner

U.S. Cl. X.R.

29—421